US012030300B2

(12) United States Patent
Schwab et al.

(10) Patent No.: US 12,030,300 B2
(45) Date of Patent: Jul. 9, 2024

(54) PRINTING MACHINE WITH A TWIN PRINTING UNIT AND METHOD OF OPERATING SUCH A PRINTING MACHINE

(71) Applicant: Heidelberger Druckmaschinen AG, Heidelberg (DE)

(72) Inventors: Werner Schwab, Bechtsrieth (DE); Hans Schadl, Hirschau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 48 days.

(21) Appl. No.: 17/507,899

(22) Filed: Oct. 22, 2021

(65) Prior Publication Data

US 2022/0126567 A1 Apr. 28, 2022

(30) Foreign Application Priority Data

Oct. 22, 2020 (DE) ......................... 102020213339.5

(51) Int. Cl.
*B41F 23/04* (2006.01)
*B41F 5/24* (2006.01)

(52) U.S. Cl.
CPC ................ *B41F 23/04* (2013.01); *B41F 5/24* (2013.01)

(58) Field of Classification Search
CPC ................. B41F 5/24; B41F 5/06; B41F 5/18
See application file for complete search history.

(56) References Cited

U.S. PATENT DOCUMENTS 1,737,190 A 11/1929 Halliwell
3,416,444 A * 12/1968 Cahn .................... B41F 13/025 101/228
7,690,099 B2 4/2010 Bapst et al.
10,919,289 B2 2/2021 Schwab
2003/0196347 A1 10/2003 Kolbe et al.
2006/0156934 A1 7/2006 Arabin et al.
2019/0016111 A1* 1/2019 Schwab .................... B41F 3/12

FOREIGN PATENT DOCUMENTS

DE 10343411 B4 7/2009
DE 212016000051 U1 9/2017
DE 102017222700 A1 1/2019
EP 1731277 B1 11/2011
IT VR20120065 A1 9/2013
WO 9400296 A1 1/1994
WO 2017177760 A1 10/2017

* cited by examiner

*Primary Examiner* — Matthew G Marini
*Assistant Examiner* — Leo T Hinze
(74) *Attorney, Agent, or Firm* — Laurence A. Greenberg; Werner H. Stemer; Ralph E. Locher

(57) ABSTRACT

A printing machine for printing on a printing substrate web includes a plurality of inline flexographic printing units which are disposed in a plane accessible to an operator of the machine. Each one of the two flexographic printing units of a respective duplex printing station includes a respective impression cylinder and a dryer disposed between the two impression cylinders along a path of web travel of the web of printing substrate. A method of operating the printing machine is also provided.

26 Claims, 11 Drawing Sheets

PRINTING MACHINE WITH A TWIN PRINTING UNIT AND METHOD OF OPERATING SUCH A PRINTING MACHINE

CROSS-REFERENCE TO RELATED APPLICATION

This application claims the priority, under 35 U.S.C. § 119, of German Patent Application DE 10 2020 213 339.5, filed Oct. 22, 2020; the prior application is herewith incorporated by reference in its entirety.

FIELD AND BACKGROUND OF THE INVENTION

The invention relates to a printing machine for printing on a printing substrate web, including a plurality of inline flexographic printing units disposed in a plane accessible to a machine operator. The invention also relates to a method of operating such a printing machine to print on a printing substrate web.

PRIOR ART

Printing machines constructed or used for packaging printing are faced with increasingly high demands in terms of profitability and ease of operation as well as in terms of their versatility as far as the manufacturing of a large variety of products is concerned. For instance, the printing machine is expected to minimize waste, e.g. when it is switched from one print job to the next. Conventional web-fed printing machines, in particular flexographic printing machines, which are constructed for packaging printing are of inline construction and are constructed to have various process planes (for instance for printing and drying) and to include a plurality of cylinders and rollers for guiding the printing substrate between those different planes. Thus, the length of web which is present in the printing machine is considerable and there may be a corresponding amount of waste.

Inline machinery for manufacturing folding box blanks, i.e. for printing and rotationally die-cutting them, are known, for instance, from European Patent EP 1 731 277 B1, corresponding to U.S. Pat. No. 7,690,099. The manufacturing process includes printing on a web-shaped substrate in a web-fed printing press with multiple printing units, potentially using various printing processes. Then the printing substrate web is subjected to further processing steps such as die-cutting, embossing, varnishing, etc.

German Patent DE 103 43 411 B4, corresponding to U.S. Patent Application Publication No. 2006/0156934, discloses a rotary printing machine with a plurality of printing units which may be equipped with so-called sleeves to provide fast print job changes. For that purpose, a motor is provided to move the axes of the sleeves into a change position in which the axes are easily accessible. Once the sleeves have been changed, the sleeves and their axes are moved back from a change position to an operating position.

A disadvantage of those prior art printing machines is that for a sleeve change, the printing operation needs to be stopped, which means that the required times of standstill reduce the performance of the printing machine. If a color change is required, longer periods of standstill are required. In addition, during start-up unusable products, i.e. printed web sections that are waste, are created after every standstill.

SUMMARY OF THE INVENTION

It is accordingly an object of the invention to provide a printing machine with a twin printing unit and a method of operating such a printing machine, which overcome the hereinafore-mentioned disadvantages of the heretofore-known printing machines and methods of this general type and in which the printing machine allows fast and easy job changes while minimizing the number of unusable products.

With the foregoing and other objects in view there is provided, in accordance with the invention, a printing machine for printing on a printing substrate web, comprising a plurality of inline flexographic printing units disposed in a plane that is accessible to an operator of the machine, two flexographic printing units of the plurality of flexographic printing units together forming a duplex printing station, and every one of the two flexographic printing units of a respective duplex printing unit including an impression cylinder and a dryer disposed between the two impression cylinders along the traveling path of the printing substrate web.

The printing machine of the invention is used to print on a printing substrate web, in particular a web made of paper, cardboard, plastic, or a composite material and includes a plurality of flexographic printing units disposed in a row. Due to the inline construction, the printing machine may be extended as desired. The flexographic printing units are disposed on a plane which is accessible to an operator of the machine, in particular on a horizontal plane, and at an ergonomically convenient level allowing easy access.

Advantageously every two flexographic printing units jointly form a duplex printing station. Each one of the two flexographic printing units of a respective printing station includes an impression cylinder. This construction of a printing station may be referred to as a duplex or twin printing station or as a double ink deck (DID) as opposed to a single ink deck (SID).

The dryer is preferably a radiation dryer such as a UV dryer or an electron beam dryer. A UV dryer applies ultraviolet radiation to the printing ink, causing it to cure. The same is true for an electron beam dryer. Thus instead of "drying," the term used when UV radiation or electron beams are used is "curing." Therefore, a corresponding dryer may also be referred to as a curing device.

Prints may be applied to a first (front) side of the printing substrate and to an opposite second (back) side of the printing substrate. The printing substrate may be guided by guide rollers. While it is being guided, it may be switched from front side to back side. An additional turning device apart from the guide rollers does not need to be provided.

The expression "the flexographic printing units are disposed in a plane which is accessible to the machine operator" is understood to mean that the flexographic printing units as such are disposed in a plane which is accessible to the operator. Components of the flexographic printing units, in particular cylinders and/or rollers, may be located outside of this plane. For instance, the impression cylinder or impression cylinders of a duplex printing unit may be disposed on a level which is slightly higher than that of the printing cylinders and anilox rollers of the same duplex printing unit.

The invention may preferably include the following variants:

i) at least one duplex printing station with two printing units with two impression cylinders, a preferably horizontal path of web travel between the impression cylinders, and a hot-air dryer disposed between the impression cylinders along the path of web travel. In addition, there may be a further hot-air dryer downstream of the second printing unit along the path of web travel. The further hot-air dryer may have a short drying section (if ink is applied) or a long drying section (if varnish is applied). Reference is made to FIGS. 2A and 2B for further details on variant i).

Optional additional features of variant i) include:

ii) at least one duplex printing station with a common impression cylinder and a hot-air dryer disposed at the circumference of the impression cylinder. In addition, there may be a further hot-air dryer downstream of the second printing unit along the path of web travel. The further hot-air dryer may have a short drying section (if ink is applied) or a long drying section (if varnish is applied). Reference is made to FIGS. 2C and 2D for further details on variant ii).

iii) at least one duplex printing station with a common impression cylinder and a UV dryer disposed at the circumference of the impression cylinder. In addition, there may be a further UV dryer downstream of the second printing unit along the path of web travel. The further UV dryer may be a single dryer or double dryer, i.e. it may include one or two UV units. Reference is made to FIGS. 2E and 2F for further details on variant iii).

Due to the provision of two impression cylinders with one path of web travel between the two cylinders, a long drying section advantageously becomes possible because of the dimensioning of the path of web travel and the configuration of the dryer along that path. Depending on the length of the drying section, there may be just one dryer or two or more successive dryers, preferably dryers of identical construction. Printing units which apply varnish may have a longer drying section than printing units which apply printing ink because varnish requires longer drying times. If only a short drying section is required, it may be advantageous to provide a common impression cylinder.

The provision of two impression cylinders with one path of web travel between the two cylinders advantageously provides a way of constructively matching the length of the drying section between the two impression cylinders with the printing speed. Printing machines with high production speeds (in terms of a predefined standard speed, for instance) may have a loner drying section (in terms of a predefined standard section, for instance). In printing machines with lower production speeds, the drying section may be constructed to be correspondingly shorter. The drying section may be variable, for instance by changing the distance between the two cylinders in a motor-driven way. The number of dryers may be variable; it may for instance be possible (manually or automatically) to add or remove dryer modules.

Another advantage is that the construction may save costs because only one printing unit frame is required and the manufacturing costs as well as the energy consumption of a "small" dryer are lower.

A duplex printing station may print two colors, which means that an 8-color press requires only four stations instead of eight. The stations with a non-stop or duplex printing unit may be combined.

In accordance with the preferred embodiment, the two flexographic printing units of a respective duplex printing station may be activatable/deactivatable in an alternating way. This enables continuous production, i.e. a job change on-the-fly. Alternatively, the two flexographic printing units of a respective duplex printing station may be jointly activatable/deactivatable. "Activatable"/"deactivatable" means that the activated printing units participate in the printing operation (printing mode) and the deactivated printing units do not participate in the printing operation (non-printing mode), i.e. the printing units are switched to the corresponding modes.

In accordance with an advantageous further development of the printing machine of the invention, the two flexographic printing units of each duplex printing station are disposed to be mirror-symmetrical relative to the common impression cylinder. While one flexographic printing unit prints, the other flexographic printing unit may undergo set-up or maintenance operations.

In accordance with an advantageous further development of the printing machine of the invention, the two flexographic printing units of each duplex printing station are disposed to be mirror-symmetrical relative to the two impression cylinders. While one flexographic printing unit prints, the other flexographic printing unit may undergo set-up or maintenance operations. Alternatively, both printing units of a duplex printing station may be operated simultaneously with intermediate drying, for instance by using hot air or IR radiation.

In accordance with a particularly advantageous and thus preferred embodiment, a dryer is provided downstream of every duplex printing station. An advantage of such a configuration is that after the ink has been applied, it may be dried completely; thus the printing substrate web may be easily diverted without any transfer of printing ink from the printed side of the printing substrate to a guide roller, for instance. Alternatively, every duplex printing station may include at least one dryer, preferably two, three, or four dryers.

In accordance with a particularly advantageous and thus preferred embodiment, every duplex printing station may be operated in combination with different dryer systems, for example UV, IR, or hot air, as a function of the requirements of the printing process. An advantage of this feature is that UV light, IR light, or hot air may be used in the drying operation in accordance with the requirements (referred to as hybrid drying) to completely dry the applied amount of ink in an advantageous way; thus the printing substrate web may easily be diverted without any transfer of ink. Alternatively, every duplex printing station may include at least one dryer, preferably two, three, or four dryers of different systems.

In accordance with a particularly advantageous and thus preferred embodiment, every duplex printing station may be operated with different dryer systems in accordance with the requirements of the process, for instance with UV radiation, IR radiation, or hot air, and the dryer systems may be switched for example by exchanging corresponding cartridges. An advantage of this feature is that UV light, IR light, or hot air may be used in the drying operation in accordance with the requirements to completely dry the applied amount of ink in an advantageous way; thus the printing substrate web may easily be diverted without any transfer of ink. Alternatively, every duplex printing station may include at least one dryer, preferably two, three, or four dryers of different systems.

In accordance with a particularly advantageous and thus preferred embodiment, every duplex printing station may be operated with different dryer systems in accordance with the requirements of the process, for instance with UV radiation, IR radiation, or hot air, and the dryer systems may be swapped between a plurality of the duplex printing stations, for example by exchanging corresponding cartridges between duplex printing stations. For instance, the UV dryer of a printing unit of one duplex printing station may be swapped for an IR emitter of another duplex printing station. An advantage of this feature is that UV light, IR light, or hot air may be used in the drying operation in accordance with the requirements to completely dry the applied amount of ink in an advantageous way; thus the printing substrate web may easily be diverted without any transfer of ink.

It is preferred that the dryer is a UV dryer or that the dryers are UV dryers. It is further preferred that the common impression cylinder of a respective duplex printing station is embodied as a temperature-controlled cylinder, in particular as a cooling cylinder.

Controlling the temperature of the cylinder, in particular cooling the cylinder, advantageously ensures that the temperature of the printing forme and/or the circumference of the temperature-controlled cylinder, in particular of the impression cylinder, is kept constant.

It is preferred that the dryer is a UV dryer or that the dryers are UV dryers. It is further preferred that at least one of the impression cylinders of the respective duplex printing station is embodied as a temperature-controlled cylinder, in particular as a cooling cylinder.

It is further preferred that both impression cylinders of the respective duplex printing station are embodied as temperature-controlled cylinders, in particular as cooling cylinders.

In accordance with a particularly advantageous and thus preferred embodiment, every duplex printing station includes the following features disposed to succeed one another in the direction of printing substrate transport at the circumference of the temperature-controlled cylinder: a flexographic printing unit; one or two UV dryer(s) or IR dryer(s); a flexographic printing unit; and one or two UV dryer(s) or IR dryer(s).

In accordance with an advantageous further feature, a respective printing unit is equipped with an ink application device and a flexographic printing cylinder with a printing sleeve which carries the printing forme.

In practice, it has been found to be advantageous for the radius of a respective impression cylinder to be smaller than 1000 mm (in case of hot-air drying).

In accordance with a particularly advantageous and thus preferred embodiment, in addition to the plurality of flexographic printing units, at least one further flexographic printing unit is provided as a single printing station, preferably as a varnishing station.

In accordance with a particularly advantageous and thus preferred embodiment the single printing station is disposed upstream of the plurality of flexographic printing units, or, alternatively, the single printing station is disposed downstream of the plurality of flexographic printing units.

In accordance with a particularly advantageous and thus preferred embodiment, the single printing station is disposed downstream of the duplex printing station or downstream of a last duplex printing station as viewed in the direction of printing substrate transport.

In accordance with a particularly advantageous and thus preferred embodiment, the impression cylinder of the single printing station is embodied as a temperature-controlled cylinder and the following elements are successively disposed at the circumference of the temperature-controlled cylinder in the direction of printing substrate transport: a flexographic printing unit; and one or two UV dryer(s) or IR dryer(s).

In accordance with a particularly advantageous and thus preferred embodiment, the dryer systems of single printing stations, for instance UV radiation, IR radiation, or hot air, and those of duplex printing stations may be swapped and operated depending on the requirements of the process. For example, the UV dryer from a single printing station (SID—single ink deck) may be swapped for the IR dryer of the duplex printing station (DID—double ink deck). An advantage of this feature is that UV light, IR light, or hot air may be used in the drying operation in accordance with the requirements to completely dry the applied amount of ink in an advantageous way; thus the printing substrate web may easily be diverted without any smearing.

In accordance with a particularly advantageous and thus preferred embodiment, in a section—or in all sections—a) between two duplex printing stations and/or b) between the duplex printing station—or a last duplex printing station—and the single printing station, the printing substrate web runs in a second plane which is substantially below the plane.

In accordance with a particularly advantageous and thus preferred embodiment the length of the printing substrate web in this section—or in all sections—is shorter than the length of the printing substrate web in a duplex printing station.

The length of the printing substrate web between two impression cylinders in a duplex printing station may, for instance, be shorter than 1.5 m or even shorter than 1 m.

In accordance with a particularly advantageous and thus preferred embodiment, starting from the second plane, the printing substrate web forms a loop which is open towards the top or towards the bottom in every duplex printing station.

In accordance with a particularly advantageous and thus preferred embodiment the loop runs around the impression cylinder and around at least two or three guide rollers disposed between the plane and the further plane.

In accordance with a particularly advantageous and thus preferred embodiment the last duplex printing station is followed by a single printing station and a hot air dryer succeeding one another in the direction of printing substrate transport.

In accordance with a particularly advantageous and thus preferred embodiment the printing machine includes at least one duplex printing station with two impression cylinders and at least one duplex printing station with a common impression cylinder.

In accordance with a particularly advantageous and thus preferred embodiment the duplex printing station with a common impression cylinder includes a dryer disposed at the circumference of the common impression cylinder.

With the objects of the invention in view, there is also provided a method of operating a printing machine as described above to print on a printing substrate web. In accordance with the invention, a maximum of one flexographic printing unit of a respective duplex printing station is active to print on the printing substrate web.

Advantageously, the respective other flexographic printing unit, i.e. the inactive printing unit of a duplex printing station, may be subjected to set-up or maintenance operations or it may be in an inactive stand-by position. Set-up operations may, for instance, include a printing sleeve change or an ink change. This is an easy way to use and exchange special colors. Maintenance operations may for instance include a blade change on the doctor blade.

In accordance with a particularly advantageous and thus preferred further development of the method of the invention, the flexographic printing units of a respective duplex printing station are activatable in an in-register way and the flexographic printing units of a respective duplex printing station are deactivatable to enable on-the-fly flexographic printing unit changes upon a job change. This means that to implement a job change, a printing station is switched from one flexographic printing unit to the other flexographic printing unit; thus the flexographic printing units of the different printing stations are synchronized with each other so as to avoid the production of waste in between jobs and to allow the printing substrate web to be continuously printed on.

In accordance with a particularly advantageous and thus preferred further development of the method of the invention a measuring device, for instance including a camera, may be provided, for instance in a prepress department, to measure printing formes and to transmit the obtained data (topography, elevations and/or dot density) to a duplex printing station so that the latter may carry out a flying change in an in-register way and/or at a preadjusted printing pressure (distance between the printing cylinder and the impression cylinder/printing substrate and distance between the printing cylinder and the anilox roller) which has been optimized for high-quality printing.

Alternatively, a method of the invention may envisage that both flexographic printing units of a printing station are active to print on the printing substrate web. In accordance with this alternative, a machine that has four printing stations, for instance, may print eight colors instead of just four.

In accordance with a particularly advantageous and thus preferred embodiment, the printing substrate, in particular the web, may have been pretreated and/or have already been printed on, for instance by the application of cold foil and/or of one or more printing inks. Colors, in particular four or eight colors, may be imprinted upon such a pretreated and/or preprinted web. This process may be in register with a preexisting print and/or application.

As far as it makes sense from a technical point of view, combinations of the invention as described above and of the advantageous further developments of the invention likewise form advantageous further developments of the invention.

Further advantages and embodiments of the invention that are advantageous in constructional and functional terms will become apparent from the dependent claims and the description of exemplary embodiments with reference to the appended figures.

Other features which are considered as characteristic for the invention are set forth in the appended claims.

Although the invention is illustrated and described herein as embodied in a printing machine with a twin printing unit and a method of operating such a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention will be explained in more detail based on the appended figures. In the figures, elements and components that correspond to one another have the same reference symbol. For more clarity, the figures have not been drawn to scale.

DETAILED DESCRIPTION OF THE INVENTION

Figure 3:
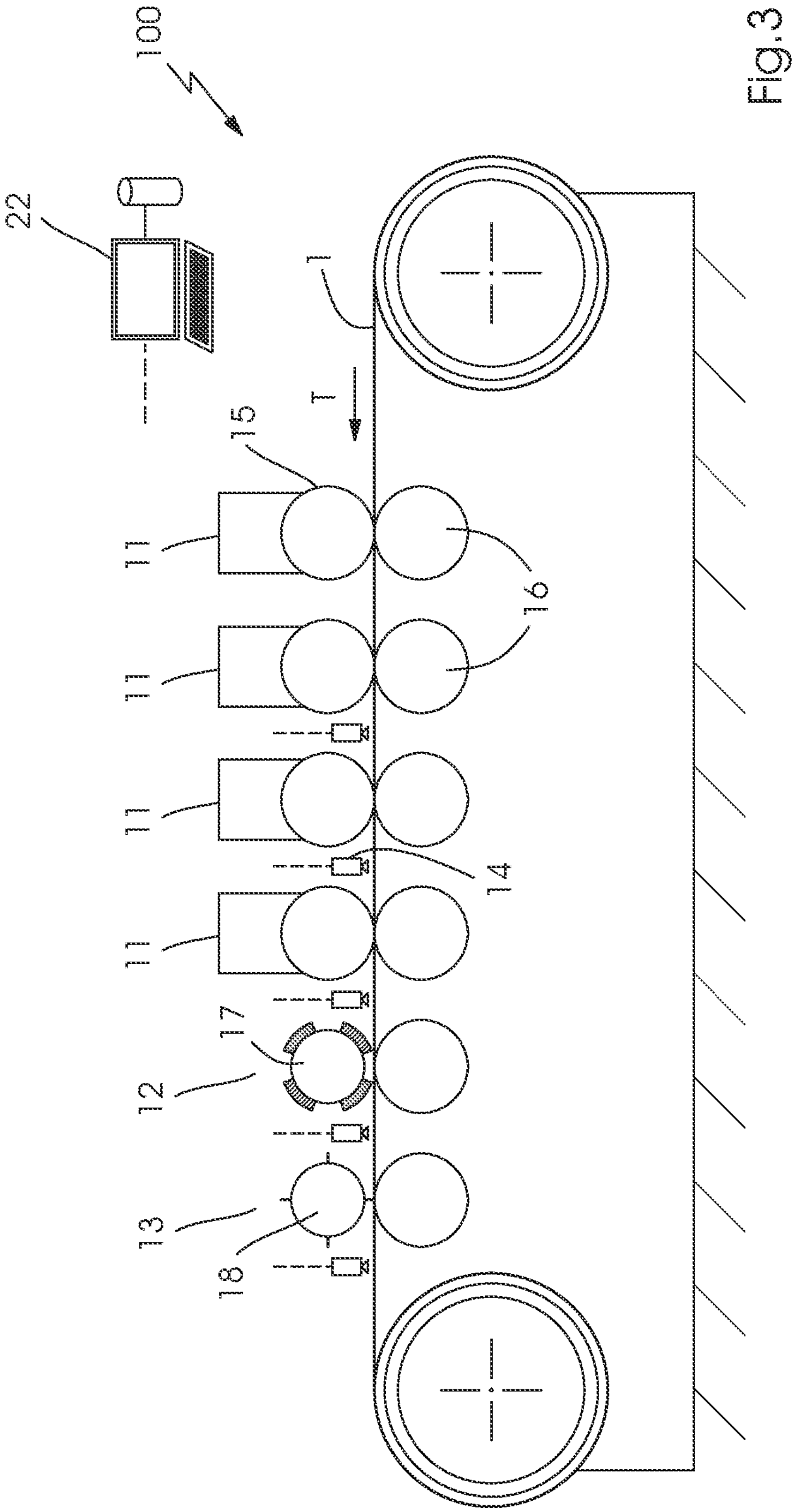
Fig.3 PRIOR ART
FIG. 3 is a longitudinal-sectional view of a web-fed printing machine in accordance with the prior art.

Referring now to the figures of the drawings in detail and first, particularly, to FIG. 3 thereof, there is seen a prior art rotary printing machine 100 for printing on a printing substrate web 1. The printing substrate web 1 is transported through a plurality of treatment units in a direction of transport T for various treatments. The treatment tools are flexographic printing units 11 (unit 11*a* at the inlet and unit 11*b* at the outlet of the duplex printing unit), an embossing unit 12, and a die-cutting and creasing unit 13. Inspection systems 14, for instance embodied as cameras for continuously monitoring the in-register treatment of the printing substrate web 1, are disposed next to the web path of the printing substrate web 1. The systems in particular monitor the circumferential and lateral registers. Inspection systems 14, flexographic printing units 11, embossing unit 12, and die-cutting and creasing unit 13 are connected to a control unit 22 by data transmission lines and may be actuated by the control unit 22.

Figure 1:
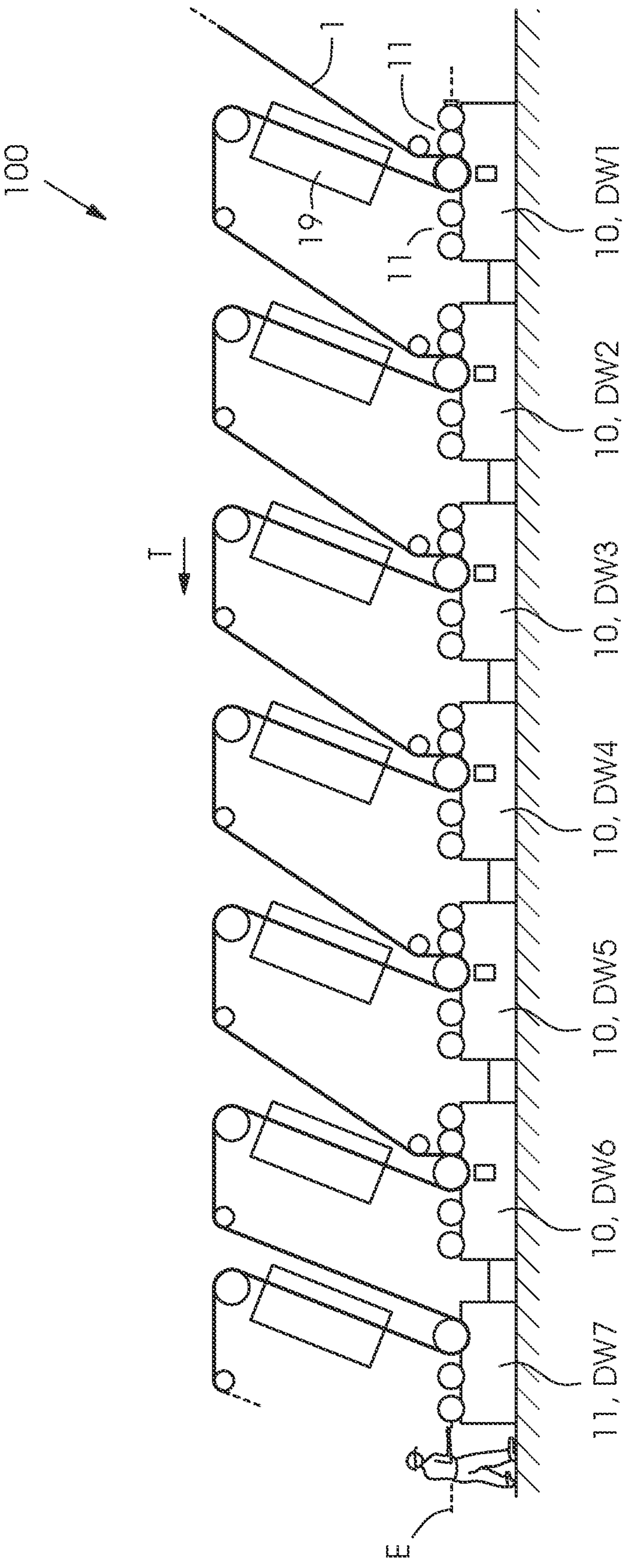
FIG. 1 is a diagrammatic, longitudinal-sectional view of a printing machine of the invention, namely a configuration including six DID stations followed by one SID station.

FIG. 1 is an overall representation of a printing machine 100. The printing machine 100 of the invention includes a plurality of flexographic printing units 11. The flexographic printing units 11 print on a printing substrate web 1 that is transported in a direction of web transport T. The flexographic printing units 11 have been numbered as DW1 to DW7. The flexographic printing units 11 are in an inline configuration on a plane E that is easily accessible to a machine operator. Two flexographic printing units 11 together form a printing station 10, at least in printing stations DW1 to DW6, which may be referred to as a twin printing unit (or as duplex printing stations or DID). The printing station DW7 is embodied as a conventional flexographic printing unit 11 (also referred to as a single printing station or SID), which may, for instance, apply a continuous layer of varnish. The first printing station 10 DW1 applies the color magenta, the second printing station 10 DW2 applies the color cyan, the third printing station 10 DW3 applies the color yellow, and the sixth printing station DW6 applies the color black. The further printing stations 10 DW4/DW5 apply special colors S1 and S2.

A dryer 19 is provided downstream of every printing station 10 in the direction of web travel T.

As shown in the printing machine 100 in FIG. 3, an embossing unit 12, a die-cutting and creasing unit 13, and a control unit 22 may be provided in addition to the flexographic printing units 11.

The construction of a respective printing station 10 will be shown in more detail in FIGS. 2A-F.

Figure 2B:
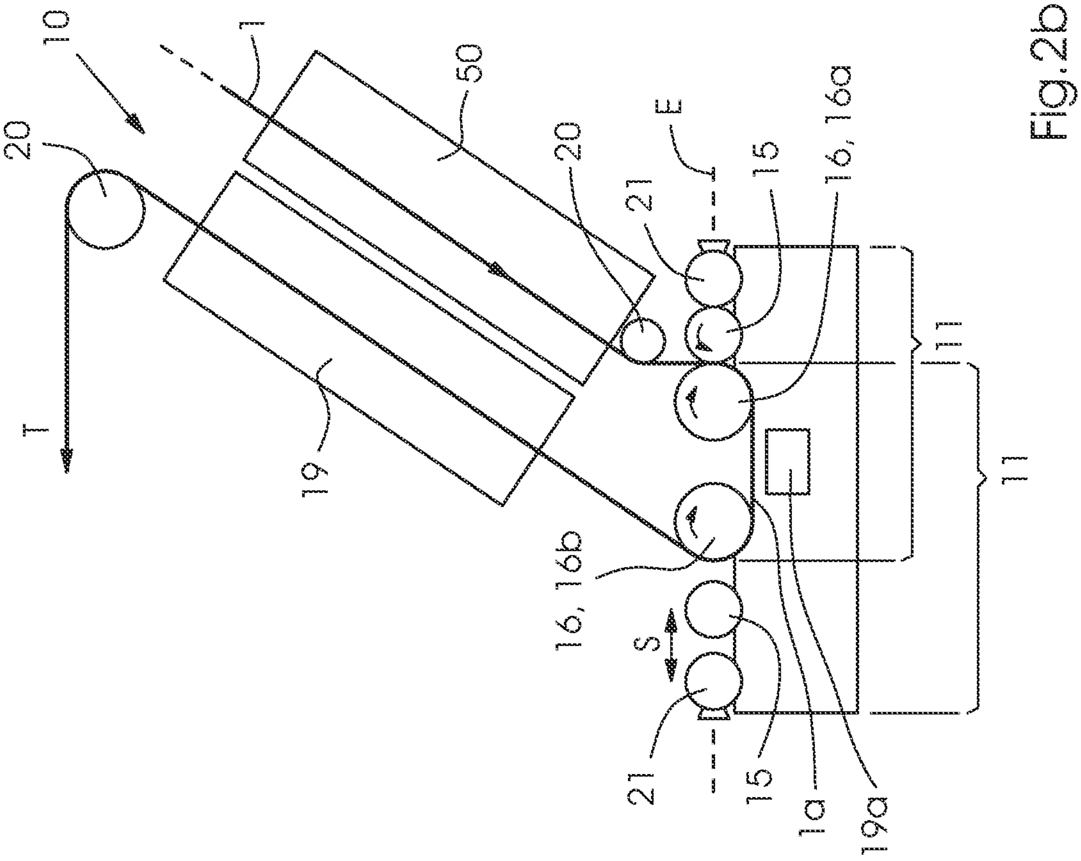
FIGS. 2A-2F are enlarged elevational views of a printing station of the printing machine shown in FIG. 1.
Figure 2A:
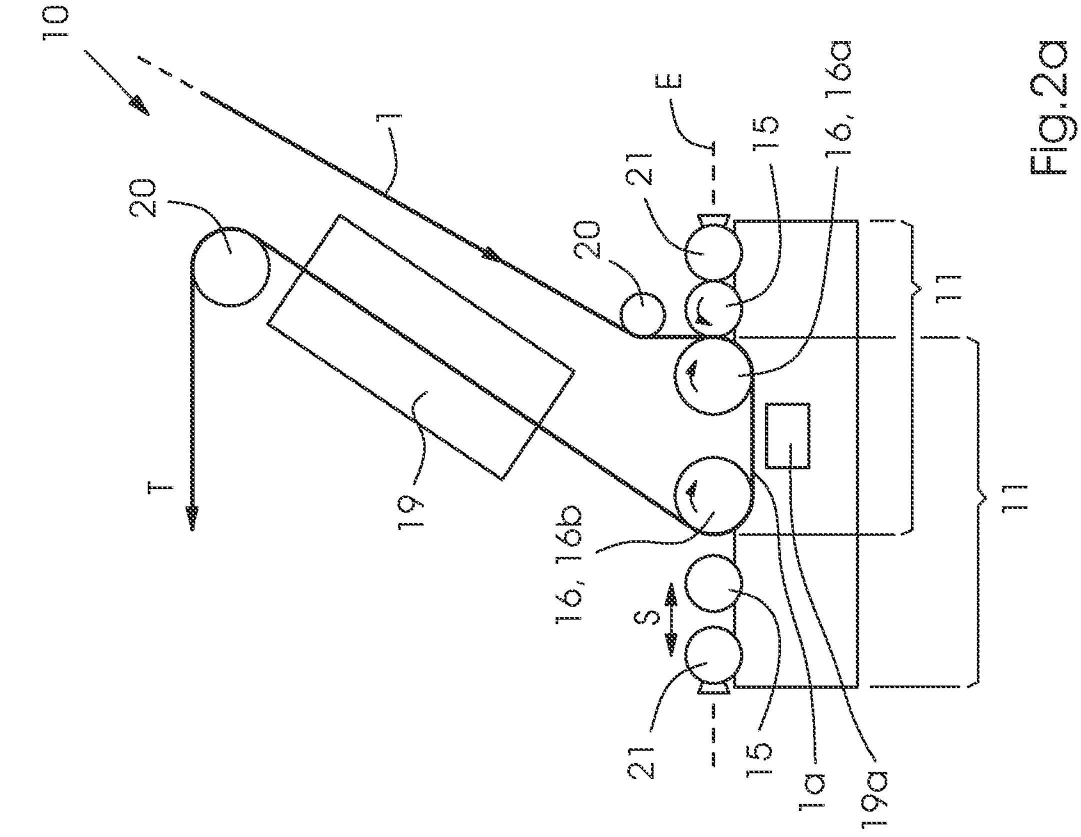
Figure 2D:
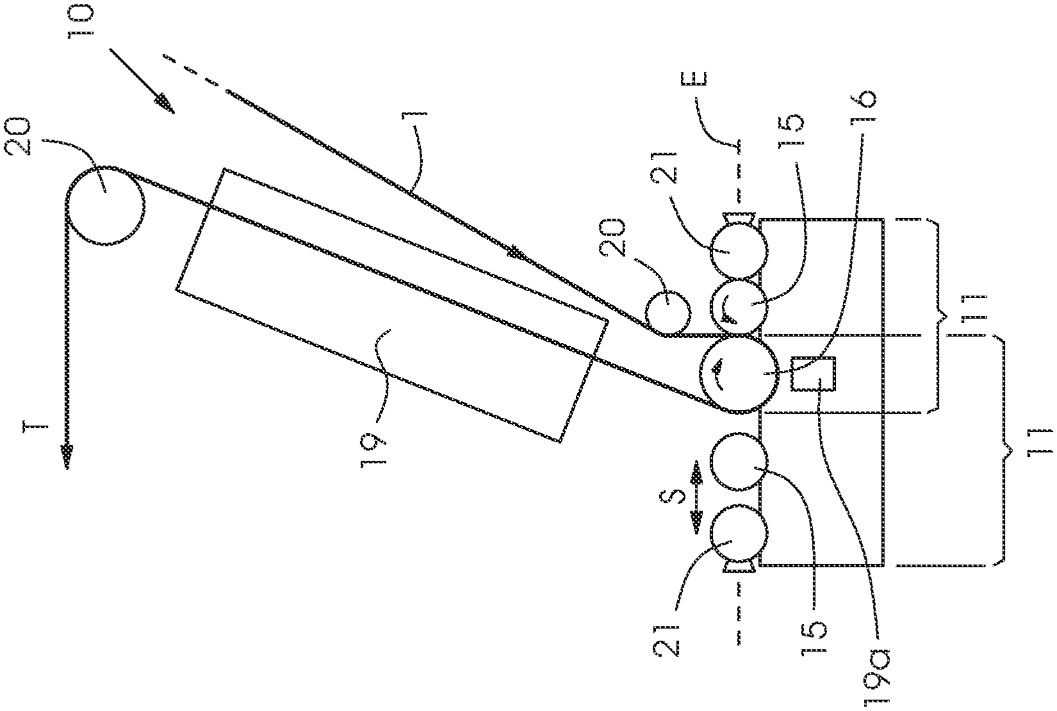
Figure 2C:
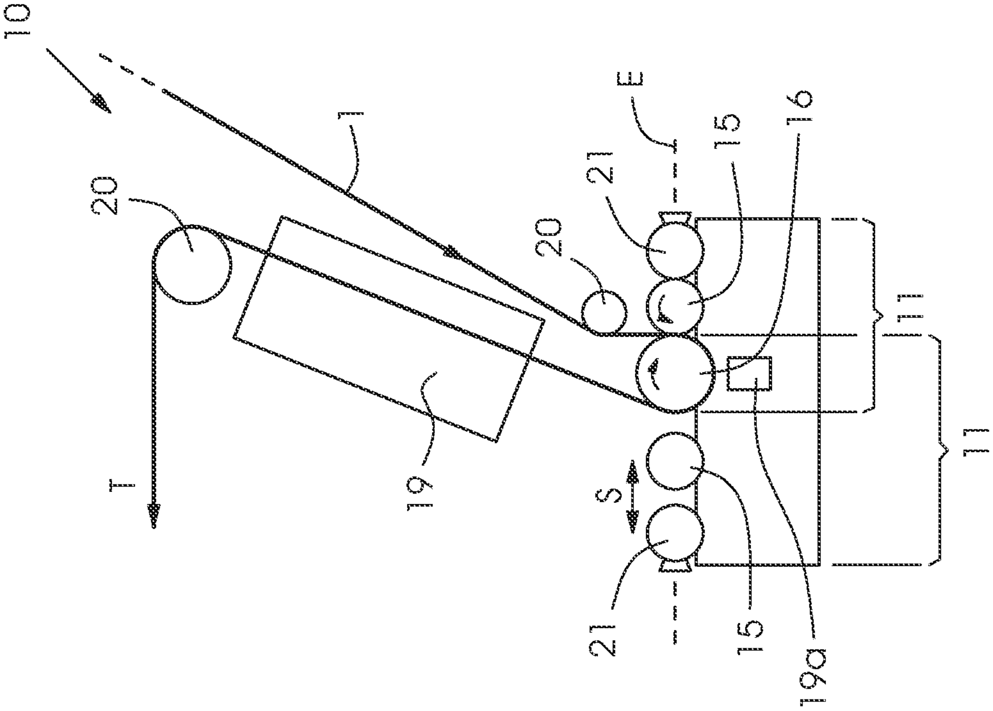
Figure 2F:
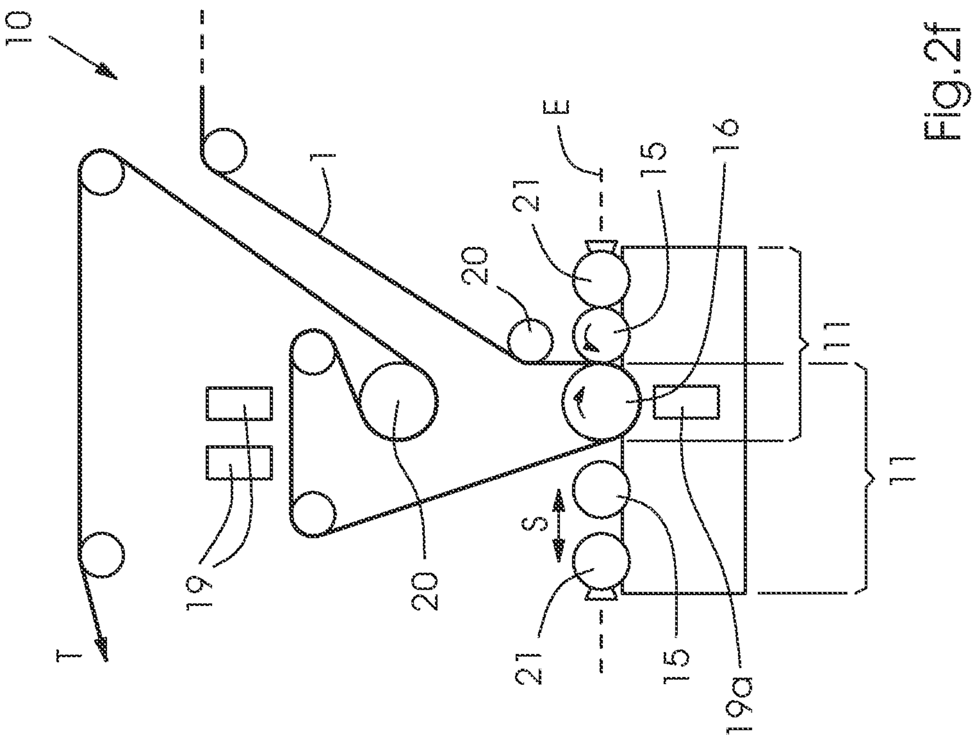
Figure 2E:
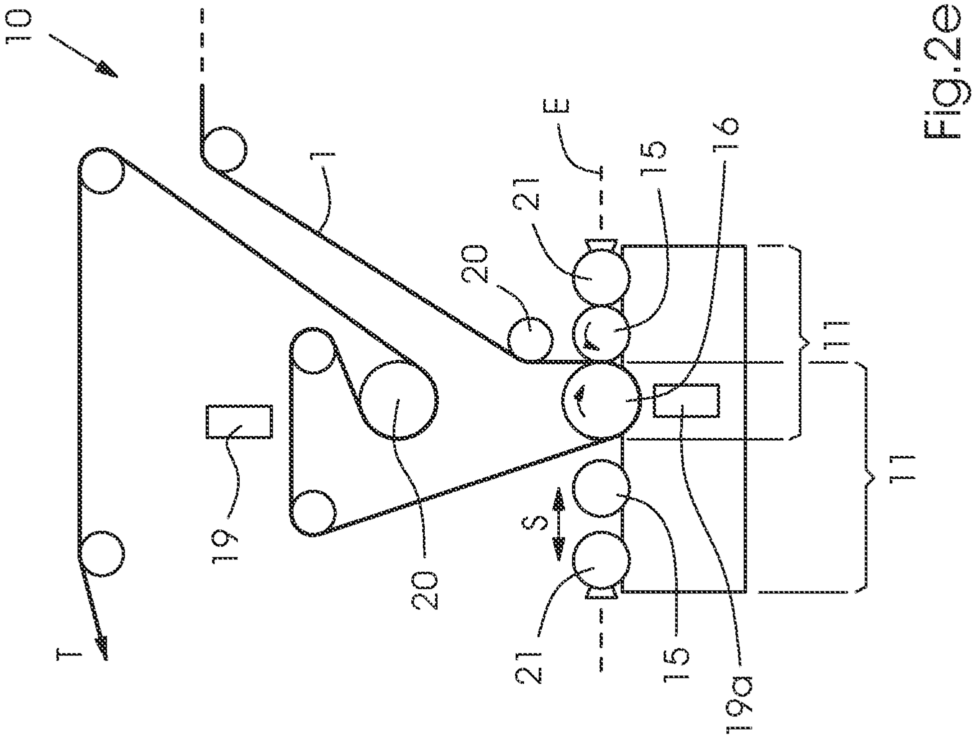

FIGS. 2C and 2D illustrate a printing substrate web 1 guided by deflection rollers 20 in a direction of web transport T and wrapping around an impression cylinder 16. Two flexographic printing units 11, each one of which includes a flexographic printing cylinder with a printing sleeve 15, an impression cylinder 16, and an ink application device 21, form a printing station 10. The flexographic printing units 11 with their components are disposed in a plane E. The two flexographic printing units 11 have a common impression cylinder 16. The configuration of flexographic printing cylinders 15 and ink application device 21 of the two flexographic printing units 11 is mirror-symmetrical to a vertical axis of reflection which passes through the impression cylinder 16. The printing station 10 is constructed in such a way that one of the two flexographic printing units 11 prints and is in an active position. The other, inactive flexographic printing unit 11 has been disengaged from the common impression cylinder 16. An activation or deactivation of a flexographic printing unit 11 is achieved by an adjustment movement s. In the illustrations of FIG. 1 and FIGS. 2C-D, a first print job is being processed in the respective right-hand flexographic printing units 11 of a respective printing station 10. At the same time, a second print job may be prepared or maintenance work, such as a blade change at the doctor blade, may be carried out in the left-hand flexographic printing unit 11 of the printing stations 10. When a first job has been completed at a specific point in time, the right-hand flexographic printing unit 11 automatically moves into an inactive stand-by position and the left-hand flexographic printing unit 11 simultaneously moves into an active position to print the second print job. Thus, the completion of a first print job and the beginning of a second, subsequent print job are practically simultaneous. This process, which has been described in the context of a first printing station 10, is implemented in the further printing stations 10 in the same way at the same location, i.e. the second printing station 10 is switched from the first print job to the second and thus from the right-hand flexographic printing unit 11 to the left-hand flexographic printing unit 11 at precisely the location of the printing substrate web 1 where the first printing station 10 was switched over. This reduces unusable products, i.e. waste. In other words, the flexographic printing units 11 of the various printing stations 10 synchronize with one another in an in-register way, resulting in virtually no waste.

The switch from one print job to the next print job is made in an event-driven way. The triggering event may be a specified printing time, a specified length of the web of substrate that has been printed, a specified number of printed copies, a change of material, or an initiating operation by the machine operator. Due to such an event-driven control of the printing machine 100 by using a control unit 22, the printing machine 100 is capable of preparing for the next print jobs while processing a current print job and may successively process the next print jobs.

A dryer 19*a*, preferably a hot-air dryer 19*a*, is disposed at the circumference of the common impression cylinder 16. This dryer preferably acts as an intermediate dryer. In addition, a dryer 19 is provided. This dryer preferably acts as a final dryer.

As compared to FIGS. 2C and 2D, FIGS. 2A and 2B illustrate an embodiment which includes two impression cylinders 16*a* and 16*b* instead of the common impression cylinder 16. The web 1 is guided on a web path 1*a* between the two impression cylinders 16*a* and 16*b*, preferably in a horizontal direction. The dryer 19*a* is disposed at the web path 1*a* instead of at the common impression cylinder 16. The dryer preferably acts as an intermediate dryer. In addition, a dryer 19 is provided. This dryer preferably acts as a final dryer.

Alternatively, a dryer system with one or two fixed UV dryers or changeable drying systems, for instance IR or hot air dryers, may be provided at a location between the two impression cylinders 16 where the web 1 is preferably guided in a horizontal direction on the web path 1*a*. The dryer(s) is/are preferably used as intermediate dryers. In addition, a dryer 19 is provided, which preferably acts as a final dryer.

FIG. 2B illustrates a (pre-)conditioning unit 50, which may advantageously be used to condition/precondition the web before it enters the first printing unit, in particular to bring its temperature up to an operating temperature and/or to shrink the web. This may avoid register problems because if this is done, the web has been preshrunk and/or its temperature has been adjusted before the first printing unit as much as it would otherwise not have been until after the second printing unit/the downstream dryer.

As compared to FIGS. 2A and 2B, FIGS. 2E and 2F once again illustrate an embodiment which includes a common impression cylinder 16. In this case, a UV dryer 19*a* is disposed at the circumference of the common impression cylinder. This dryer preferably acts as an intermediate dryer. In addition, a UV dryer 19 is provided, which preferably acts as a final dryer.

Figure 4:
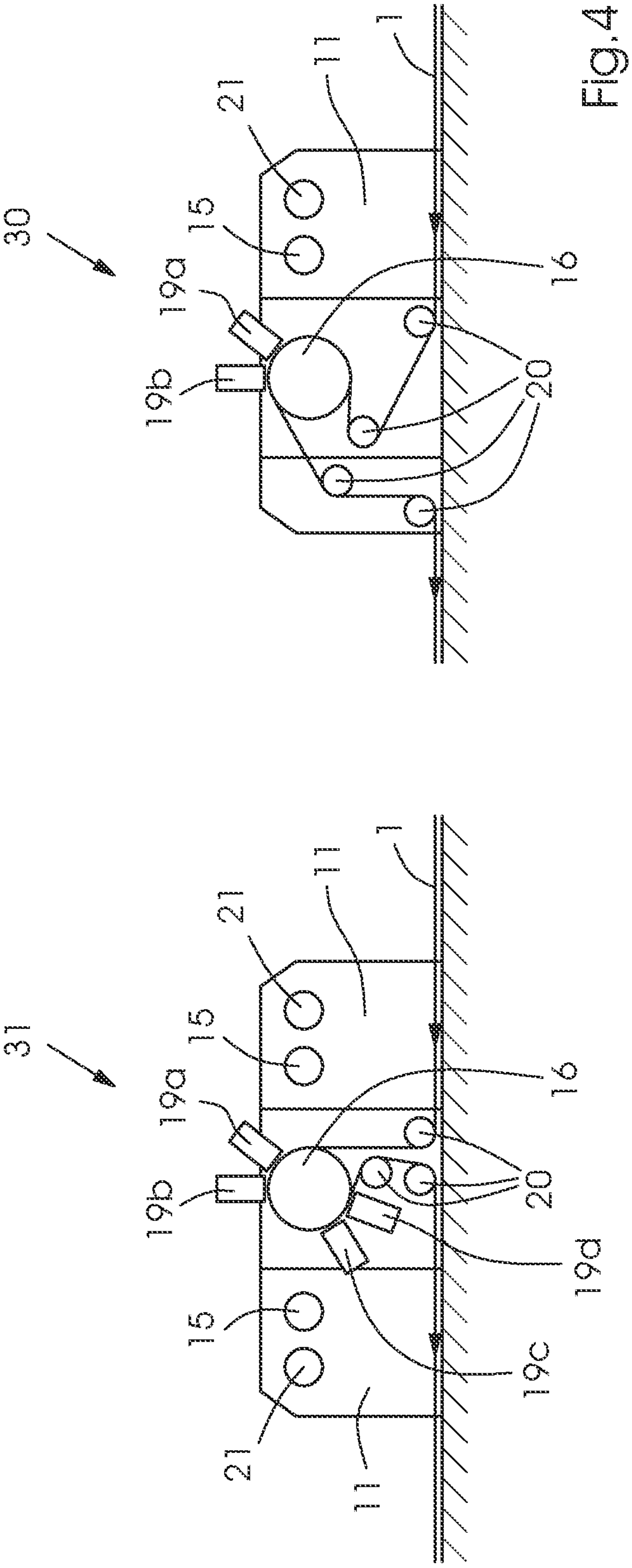
FIG. 4 is a group of elevational views illustrating the difference between a DID and an SID station.

FIG. 4 illustrates the difference between a DID station 31 (on the left-hand side of the figure) and an SID station 30 (on the right-hand side of the figure). Such stations may be provided in the configurations shown in the present application (see FIG. 7, for instance).

Both stations are embodied as so-called short web stations: if UV inks are used, the dryer section may be chosen to be much shorter; UV dryers may in particular be disposed on the circumference of a (central) impression cylinder or between two impression cylinders in a space-saving way. Compared to thermal drying of water-based or solvent-based inks (see FIGS. 1, 8, and 9, for instance), the drying section is much shorter. The path of web travel between the stations may additionally be in a plane below the plane E which is accessible to the operator of the machine. The web is thus guided to the stations from below. The short web path between the stations results in an improved register behavior. In addition, the process of starting up the printing machine is shortened to a considerable extent. The (central) impression cylinder/the two impression cylinders is/are preferably embodied as (a) temperature-controlled cylinder(s), in particular as a cooling cylinder.

The DID station 31 includes the following elements in the direction of printing substrate transport: a deflection roller 20 for the web 1, a central impression cylinder 16, a first flexographic printing unit 11 assigned to the latter (and including a flexographic printing cylinder 15 and an ink application device 21 such as an anilox cylinder), one or (as illustrated) two dryers 19, a second flexographic printing unit 11, one or (as illustrated) two further dryers 19, and two deflection rollers 20. The dryers are preferably UV dryers. Such a station is capable of applying two colors at the same time.

Alternatively, the DID station 31 may include the following in the direction of printing substrate transport: a deflection roller 20 for the web 1, two impression cylinders 16, a first flexographic printing unit 11 assigned to the latter (and including a flexographic printing cylinder 15 and an ink application device 21 such as an anilox cylinder), one or (as illustrated) two dryers 19, a second flexographic printing unit 11, one or (as illustrated) two further dryers 19, and two deflection rollers 20. The dryers are preferably UV dryers or IR dryers. Such a station is capable of applying two colors at the same time.

The SID station 30 includes the following elements in the direction of printing substrate transport: preferably two deflection rollers 20 for the web 1, an impression cylinder 16, a flexographic printing unit 11 assigned to the latter (and including a flexographic printing cylinder 15 and an ink application device 21 such as an anilox cylinder), one or (as illustrated) two dryers 19*a*, 19*b*, and preferably a deflection roller 20. The dryers are preferably UV dryers. Such a station is capable of applying one color.

Figure 5:
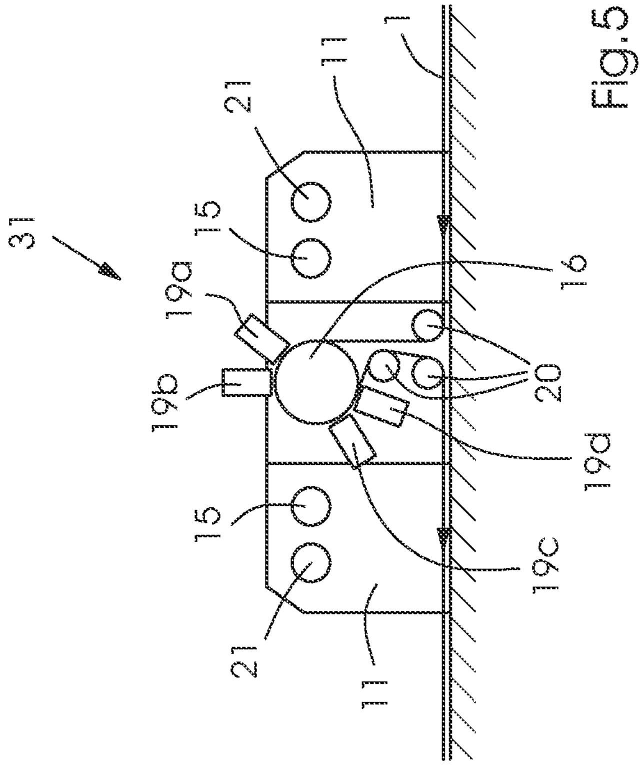
FIG. 5 is an elevational view illustrating a DID station with two flexographic printing units that may be activated simultaneously.

FIG. 5 illustrates a DID station with two flexographic printing units 11 that are simultaneously activatable. One or (as shown) two dryers 19 are disposed downstream of every flexographic printing unit 11 at the (central) impression cylinder 16. The dryers are preferably UV dryers.

Alternatively, a DID station with two simultaneously activatable flexographic printing units 11 with two impression cylinders 16 may be provided; in this case, one dryer 19 or two dryers 19 is/are provided downstream of every flexographic printing unit 11. The dryers are preferably UV or IR dryers.

Figure 6:
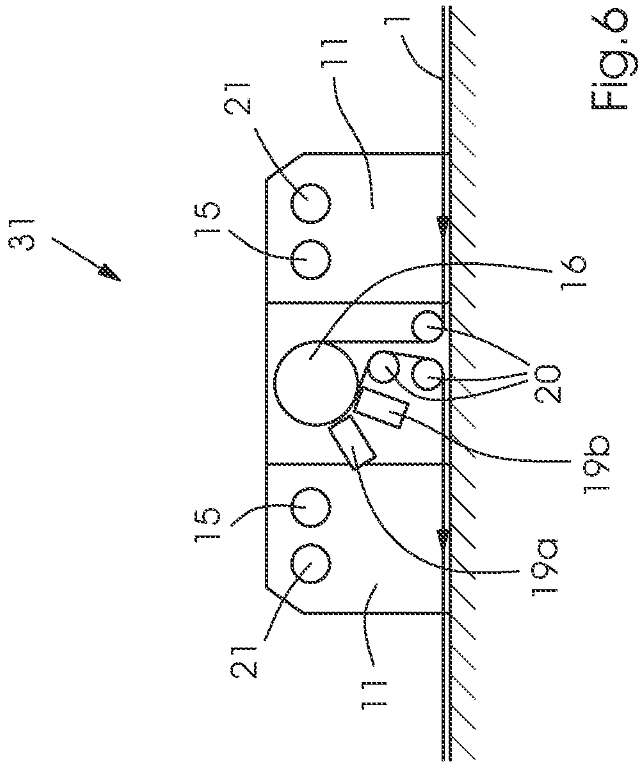
FIG. 6 is an elevational view illustrating a DID station with two flexographic printing units that may be activated in an alternate way.

FIG. 6 illustrates a DID station with two flexographic printing units 11 that are alternately activatable. One or (as shown) two dryers 19 are disposed downstream of the last flexographic printing unit 11 at the (central) impression cylinder 16. The dryers are preferably UV dryers.

Alternatively, the DID station with two alternatingly activatable flexographic printing units 11 may be provided; in this case, one or two dryers 19 are disposed downstream of the last one of the two flexographic printing units 11. The dryers are preferably UV or IR dryers.

Figure 7:
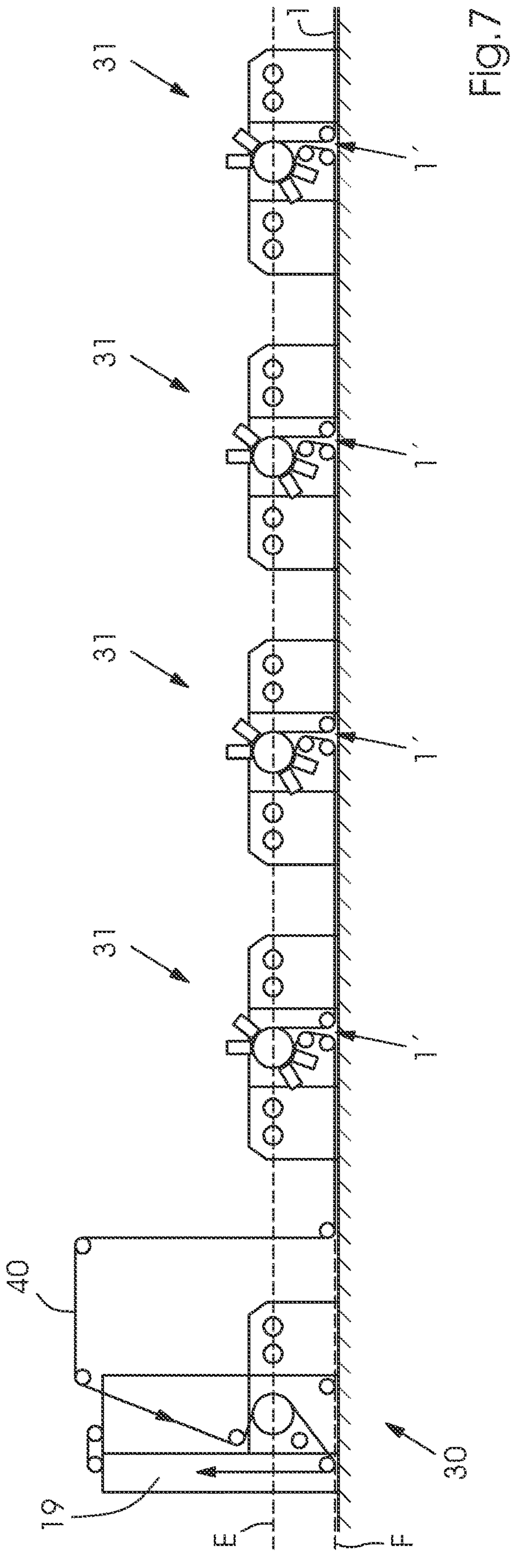
FIG. 7 is a longitudinal-sectional view illustrating a so-called a gable top application.

FIG. 7 illustrates a further application, namely a machine with four DID short web stations 31 and an SID station 30 as well as a final thermal dryer 19. Eight colors and a varnish or silicone may be applied. A web-guiding element 40 is provided between the last station 31 and the station 30. Such a configuration is used, for instance, to produce so-called gable top packaging. As an alternative to the illustrated embodiment, each printing unit may include two impression cylinders.

Figure 8:
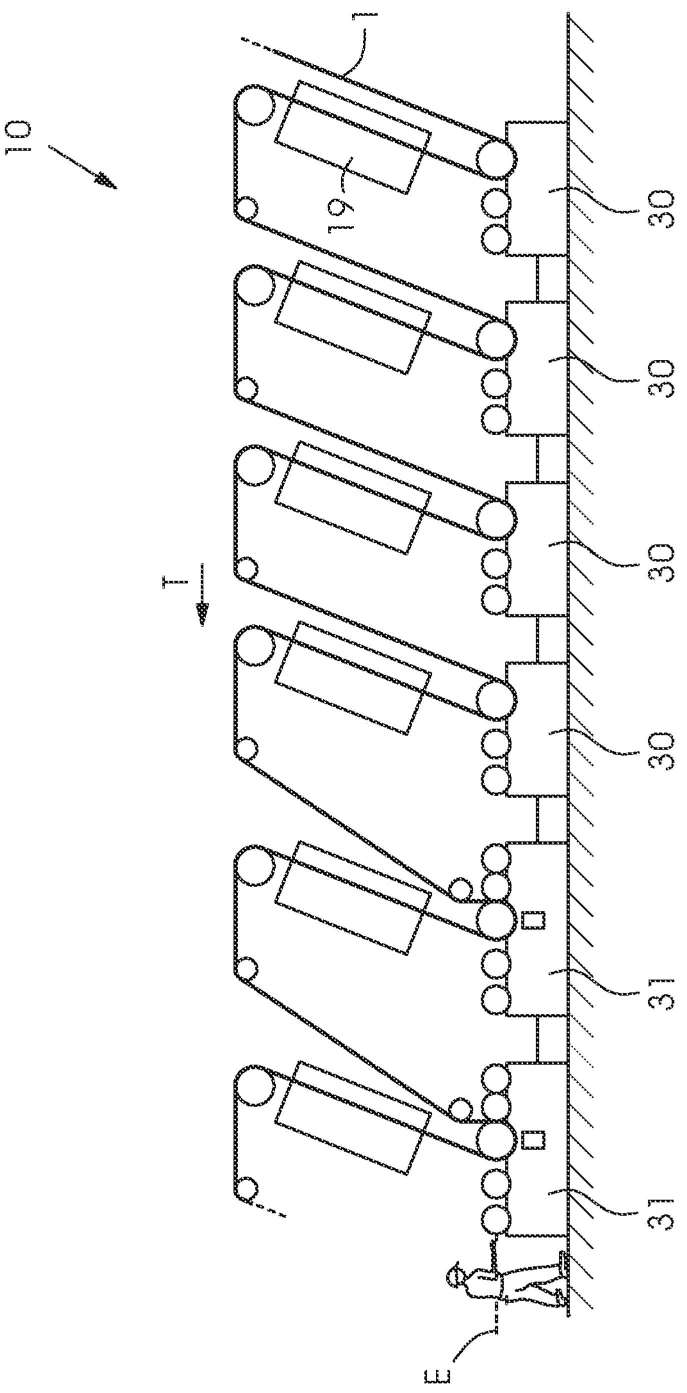
FIG. 8 is a longitudinal-sectional view illustrating a configuration with four SID stations followed by two DID stations.

FIG. 8 illustrates a configuration including four SID stations 30 followed by two DID stations 31. Every station is assigned a thermal dryer 19. The web is guided to the stations from above. The printing sequence may be as follows: CMYK process colors, special color 1, special color 3. The special color units may be changed to other special colors 2 and 4 while the production run continues.

Figure 9:
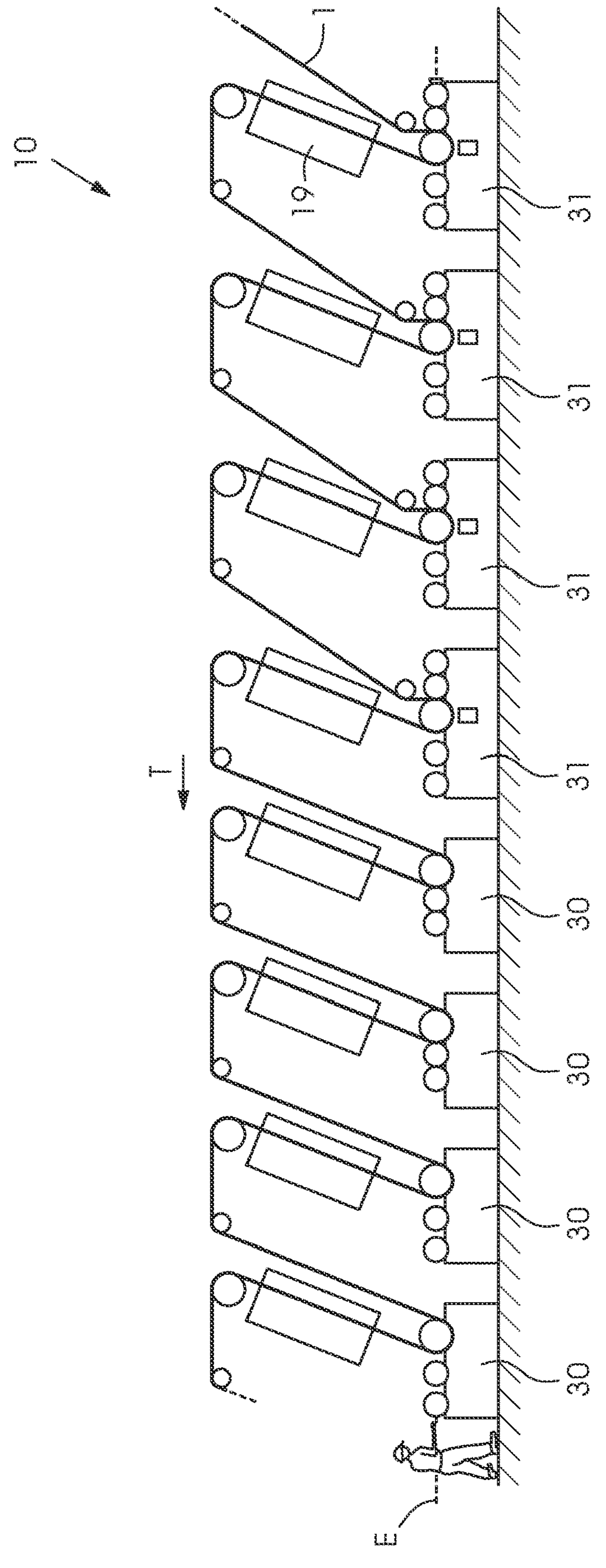
FIG. 9 is a longitudinal-sectional view illustrating a configuration with four DID stations followed by four SID stations.

FIG. 9 illustrates a configuration including four DID stations 31 followed by four SID stations 30. Every station is assigned a thermal dryer 19. The web is guided to the stations from above. The printing sequence may be as follows: CMYK process colors, special color 1, special color 2. The two last stations 30 are inactive and are prepared for a following print job or other changes are made (special colors 3 and 4).

Instead of what is shown in FIG. 1, the printing machine 100 shown in FIG. 1 may have the following construction: at least one duplex printing station 10 (preferably corresponding to FIGS. 2A to 2F, i.e. including two impression cylinders) and at least one single printing station 11 (preferably corresponding to the right-hand section of FIG. 4). Any desired combinations and sequences are possible. FIG. 8 (four SID and two DID) and FIG. 9 (four DID and four SID) illustrate respective variants: the duplex printing units with common impression cylinders shown therein would have to be replaced by duplex printing units with two impression cylinders. In addition, one or more SID unit(s) and/or one or more DID unit(s) without dryers may be provided at the impression cylinder.

Figure 10:
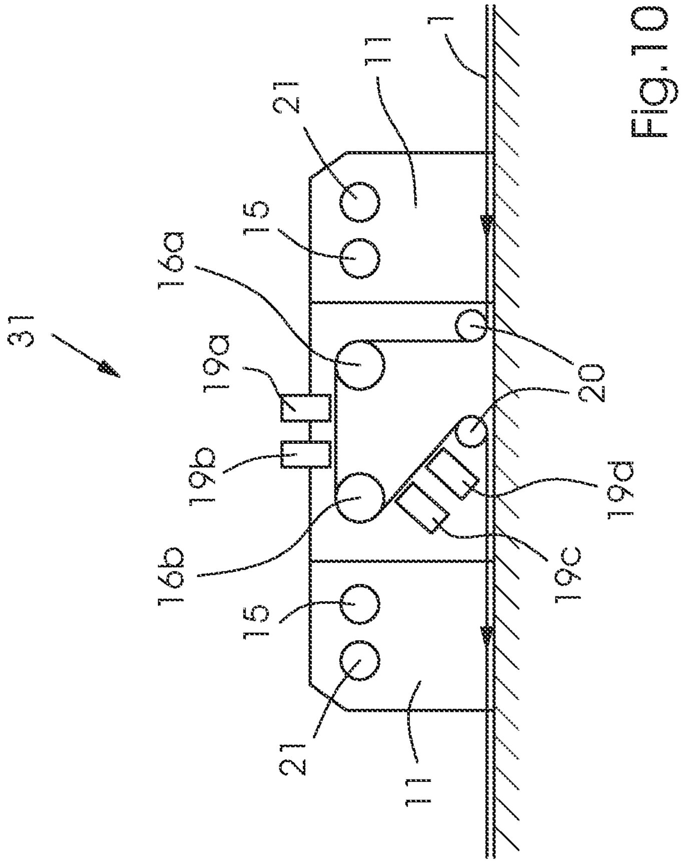
FIG. 10 is an elevational view illustrating a duplex printing unit.

FIG. 10 illustrates a duplex printing unit with two impression cylinder 16*a* and 16*b* spaced apart from one another. A printing cylinder 15 and an anilox roller 21 are associated with the first impression cylinder 16; a further printing cylinder 15 and a further anilox roller 21 are associated with the second impression cylinder 16*b*. Two dryers 19*a* and 19*b* are disposed between the two impression cylinders along the path of the printing substrate web. Two further dryers 19*c* and 19*d* are provided downstream of the second impression cylinder 16*b* along the path of the printing substrate web. Within the duplex printing unit, the web path follows a loop which is open towards the bottom.

The following is a summary list of reference numerals and the corresponding structure used in the above description of the invention:

1 printing substrate web
1' loop
1*a* path of web travel
10 printing station
11 flexographic printing unit
11*a* flexographic printing unit (inlet of a duplex printing station)
11*b* flexographic printing unit (outlet of a duplex printing station)
12 embossing unit
13 die-cutting and creasing unit
14 inspection system
15 flexographic printing cylinder with printing sleeve
16 common impression cylinder
16*a* impression cylinder
16*b* impression cylinder
17 embossing cylinder
18 die-cutting cylinder
19 dryer
19*a, b, c, d* dryer
20 deflection roller
21 ink application device
22 control unit (machine control unit with interface)
30 SID station (single ink deck)
31 DID station (double ink deck)
40 web path
50 (pre)conditioning unit
100 printing machine
s adjustment movement
E plane
F second plane
T direction of web transport
DW printing unit number
M magenta
C cyan
Y yellow
K black
S1, S2 special colors

The invention claimed is:

1. A printing machine for printing on a printing substrate web, the printing machine comprising:

a plurality of inline flexographic printing units disposed in a plane accessible to a machine operator;

every two of said flexographic printing units of said plurality of flexographic printing units both printing on the same side of the web and together forming a duplex printing station; and each one of said two flexographic printing units of a respective duplex printing station including a respective impression cylinder and a dryer disposed between said impression cylinders of said two flexographic printing units along a path of horizontal web travel of the printing substrate web.

2. The printing machine according to claim 1, wherein said two flexographic printing units of a respective duplex printing station are jointly activatable and deactivatable or alternatively activatable and deactivatable.

3. The printing machine according to claim 1, wherein:

said dryer disposed between said impression cylinders is one of between one and four dryers, or further dryers are each disposed downstream of a respective duplex printing unit.

4. The printing machine according to claim 3, wherein:

said dryer disposed between said impression cylinders is a UV dryer or an IR dryer, or said further dryers are UV dryers or IR dryers.

5. The printing machine according to claim 3, wherein at least one of said impression cylinders of said two flexographic printing units of a respective duplex printing station is a temperature-controlled cylinder.

6. The printing machine according to claim 5, wherein a flexographic printing unit is disposed at a circumference of a respective temperature-controlled cylinder in every duplex printing station.

7. The printing machine according to claim 1, wherein each respective flexographic printing unit is equipped with an ink application device and a flexographic printing cylinder with a print sleeve carrying a printing forme.

8. The printing machine according to claim 1, wherein each respective impression cylinder has a radius smaller than 1000 mm.

9. The printing machine according to claim 1, which further comprises at least one further flexographic printing unit embodied as a single flexographic printing station or as a varnishing unit, in addition to said plurality of flexographic printing units.

10. The printing machine according to claim 9, wherein:

said single printing station is disposed upstream of said plurality of flexographic printing units, or said single printing station is disposed downstream of said plurality of flexographic printing units.

11. The printing machine according to claim 9, wherein said single printing station is disposed downstream of said duplex printing station or downstream of a last duplex printing station in a direction of transport of the printing substrate web.

12. The printing machine according to claim 11, wherein:

said single printing station has an impression cylinder constructed as a temperature-controlled cylinder having a circumference; and a flexographic printing unit, and one or two UV or IR dryers are disposed in succession at said circumference of said temperature-controlled cylinder in the direction of transport of the printing substrate web.

13. The printing machine according to claim 9, wherein:

the printing machine includes sections and the printing substrate web runs at least one of:

a) between two duplex printing stations, or b) between a duplex printing station or a last duplex printing station and said single printing station, in a second plane located below said plane in one or in all of said sections.

14. The printing machine according to claim 13, wherein the printing substrate web has a length in said one section or in all of said sections being smaller than a length of the printing substrate web in a duplex printing station.

15. The printing machine according to claim 13, wherein starting from said second plane, the printing substrate web forms a loop being downwardly open in every duplex printing unit.

16. The printing machine according to claim 15, which further comprises guide rollers disposed between said plane and said further plane, the printing substrate web loop running around one of said impression cylinders or around both of said impression cylinders and around at least two or three of said guide rollers.

17. The printing machine according to claim 1, wherein said duplex printing stations include a last duplex printing station, and a single printing station and a hot-air dryer are disposed downstream of said last duplex printing station in succession in a direction of transport of the printing substrate web.

18. The printing machine according to claim 1, wherein said dryer disposed between said two impression cylinders of a duplex printing station along the path of web travel of the printing substrate web is a hot air dryer or a UV dryer.

19. A printing machine for printing on a printing substrate web, the printing machine comprising:

a plurality of inline flexographic printing units disposed in a plane accessible to a machine operator;

every two of said flexographic printing units of said plurality of flexographic printing units both printing on the same side of the web and together forming a duplex printing station; and said duplex printing stations including at least one duplex printing station with two impression cylinders and a dryer and at least one duplex printing station with an impression cylinder and a dryer being used by said two flexographic printing units along a horizontal path of web travel of the printing substrate web.

20. The printing machine according to claim 19, wherein said duplex printing station with said impression cylinder being used by said two flexographic printing units includes a dryer disposed at a circumference of said impression cylinder being used by said two flexographic printing units.

21. A method of operating a printing machine to print on a printing substrate web, the method comprising:

providing a printing machine according to claim 1; and activating and printing with a maximum of one flexographic printing unit at a time of said two flexographic printing units of a respective duplex printing station.

22. The method of operating a printing machine according to claim 21, which further comprises subjecting the other respective flexographic printing unit of the duplex printing station to set-up or maintenance operations.

23. The method of operating a printing machine according to claim 21, which further comprises activating the two flexographic printing units of a respective duplex printing station in an in-register manner and deactivating the two flexographic printing units of the respective duplex printing station.

24. The method of operating a printing machine according to claim 21, which further comprises activating at least one flexographic printing unit of a duplex printing station in an in-register manner and deactivating the at least one flexographic printing unit of the duplex printing station relative to another flexographic printing unit of the printing machine or relative to a treatment unit of the printing machine.

25. The method of operating a printing machine according to claim 24, which further comprises providing the treatment unit as an embossing unit or a die-cutting unit.

26. The method of operating a printing machine according to claim 21, which further comprises using a measuring device to measure printing forms and to transmit data obtained in the measurement to a duplex printing station at least one of for carrying out a flying change in an in-register manner or at an optimally preadjusted printing pressure in the duplex printing station.

* * * * *